W. J. DAVIS.
TEMPERATURE CHANGING APPARATUS.
APPLICATION FILED JAN. 14, 1920.

1,407,013.

Patented Feb. 21, 1922.
6 SHEETS—SHEET 1.

W. J. DAVIS.
TEMPERATURE CHANGING APPARATUS.
APPLICATION FILED JAN. 14, 1920.

1,407,013.

Patented Feb. 21, 1922.
6 SHEETS—SHEET 3.

Witnesses:
W. F. Kilroy
Harry R. L. White

Inventor:
William J. Davis

UNITED STATES PATENT OFFICE.

WILLIAM J. DAVIS, OF CHICAGO, ILLINOIS.

TEMPERATURE-CHANGING APPARATUS.

1,407,013.  Specification of Letters Patent.  Patented Feb. 21, 1922.

Application filed January 14, 1920. Serial No. 351,336.

*To all whom it may concern:*

Be it known that I, WILLIAM J. DAVIS, a citizen of the United States, and a resident of Chicago, in the county of Cook and State of Illinois, have invented certain new and useful Improvements in Temperature-Changing Apparatus, of which the following is a full, clear, and exact specification.

My invention is concerned with pasteurizers and other similar heat transferring devices by which the thermal units of one liquid passing therethrough may be transferred to another liquid of a different temperature, as, for instance, transferring the heat of hot water to cold milk for raising the latter to a pasteurizing temperature, and it is designed to produce a device of the class described which shall be simple in its construction, economical in its operation, and in which the passages for the milk can be readily gotten at for cleaning and sterilizing.

It further consists in the novel combination of a turbine adapted to be operated by the heating steam, or cooling water from the city mains, with a circulating apparatus so that the hot water, or cooling water as the case may be, may be circulated by the steam or water pressure, thus obviating the necessity of using a steam engine or an electric motor for this purpose.

To these ends it consists in certain novel combinations of elements, as described at length in the body of the specification and particularly pointed out in the claims.

To illustrate my invention, I annex hereto six sheets of drawings in which the same reference characters are used to designate identical parts in all the figures, of which—

Fig. 14 (Sheet 4) is a central longitudinal section of a novel water driven turbine which I may employ for circulating the brine;

Figure 1:
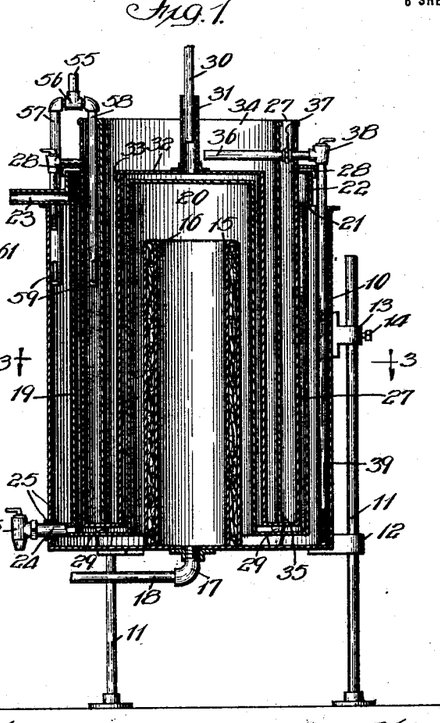
Fig. 1 is a central vertical section through a comparatively simple form of my apparatus.
Figure 2:
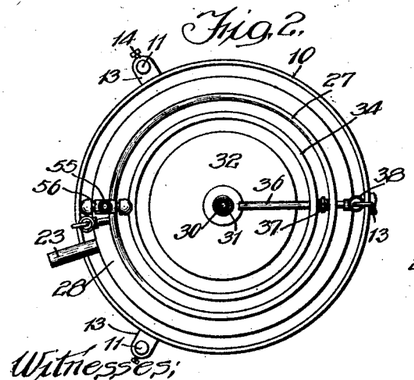
Fig. 2 is a top plan view of the same.
Figure 3:
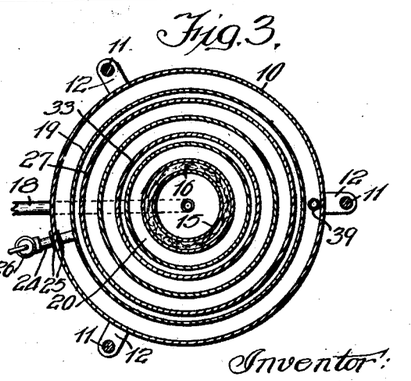
Fig. 3 is a plan view in horizontal section on the line 3—3 of Fig. 1.

In carrying out my invention in a simple form, as shown in Fig. 1, I employ a main shell or casing 10, which preferably consists of a sheet metal cylinder, open at the top and closed at the bottom, and supported on three or more legs 11, upon which it is preferably adjustably secured by having the legs pass through the ears 12 and 13 secured to the bottom and sides of the tank or casing, and having the set screws 14 by which the legs are secured with the tank thereon at any desired height. I may provide this tank with a sleeve 15, secured concentrically with the bottom thereof and extending up nearly to the top, and this sleeve is preferably constructed of a double sheet metal cylinder with some form of non-conductive packing 16, such as asbestos, between the two walls. The bottom of the cylinder is provided with a suitable outlet, such as the elbow 17 secured therein and adapted to have the water discharge pipe 18 projecting horizontally therefrom.

The second element is an inner shell or casing 19, which might be a similar cylindrical shell, closed at the bottom and open at the top, of the general shape and character of the shell 10, but I preferably form it with a reentrant cylindrical portion 20, which is concentric with the bottom of the shell and is closed at the top, the general effect being the same as if a similar cylindrical shell had been employed and the bottom of the same drawn up so that the internal cross section is annular in its outline. This shell preferably has the offset flange 21 at its upper end which brings the top portion 22 a little closer to the shell 10, and forms what might be considered as an annular discharge channel to bring the milk rising therein to the discharge outlet pipe 23 located in one side of the portion 22 and adapted to be readily connected and disconnected to a discharge pipe leading the pasteurized milk to the next part of the system. In order to draw off the last of the milk when the apparatus is stopped, I provide in the bottom thereof the supplemental discharge outlet 24, which extends through a suitable aperture in the shell or tank 20, which is provided with suitable packing nuts 25 so that there will be no substantial leakage of water around the pipe 24, and which also has the detachable valve or faucet 26 thereon which can be opened when it is desired to drain out the last of the milk. By removing the faucet 26 and the nuts 25, it will be understood that the shell 19 can be removed from the tank 20.

The third principal element is an inner shell 27, which is of the same general character as the shell 19, except that it is provided with a horizontal annular flange 28 at its upper end, which flange 28 extends over the top portion 22 of the shell 19. The flange 28 does not contact completely with the top of the oprtion 22, as there must be a passage between them to permit the escape of air rising in the apparatus when it is filled. The shell 27 has the projections 29 on the bottom thereof resting on the bottom of the shell 19 so as to space the two shells apart so as to form an annular passage between them for the milk, which enters through the pipe 30 opening into the pipe 31 which is secured and opens into the top 32 of the reentrant annular sleeve portion 33 of the shell 27.

I may employ as a fourth main element a cylindrical sleeve 34, which is provided with the cut away portions 35 at the bottom, the uncutaway parts between them forming feet resting on the bottom of the member 27 so as to form a support for the sleeve 34. I preferably employ in connection with the sleeve 34 one or more outlet pipes 36 having a detachable coupling 37 opening thereinto through the side of the member 27 and terminating in the cock 38 which is connected to the elongated discharge pipe 39 extending just inside of the tank 10 nearly to the bottom thereof.

Figure 15:
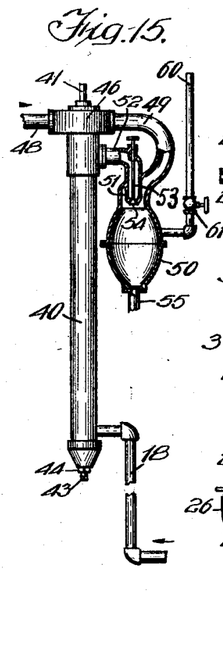
Fig. 15 (Sheet 1) is a view, partly in section, of a steam driven turbine which I may employ for circulating.
Figure 16:
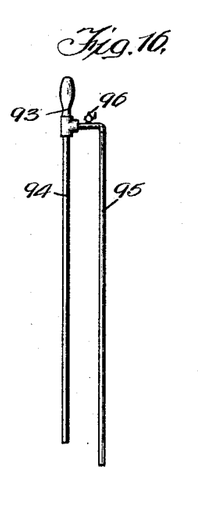
Fig. 16 is a side elevation of a siphon which I may employ to empty the containers.

The water discharge pipe 18 is preferably extended to and opens into the bottom of the tube 40, which, as seen in Fig. 14, has a vertical shaft 41 journaled therein, preferably resting on the ball 42 resting on the top of the adjusting screw 43 secured by the lock nut 44, and having its upper end journaled in the cap 45 which closes the top of the tube 40 and also serves as a part of the turbine casing in which rotates the turbine 47 secured on the upper end of the shaft 41. For the heating unit, where steam is employed to keep the water at the proper temperature, as shown in Fig. 15, it enters the turbine casing 46 through the steam supply pipe 48, and after turning the turbine, it escapes through the outlet pipe 49, which terminates in a condensing chamber 50, into which opens a nozzle 51 of a pipe 52 leading from the top of the tube 40. A valve stem 53 is threaded through the pipe 52 so that its flaring valve 54 can be adjusted to determine the size of the annular flaring orifice through which the cooled water emerging from the tube 40 is sprayed in an annular sheet to condense the steam in the chamber 50 without any noise. A pipe 55 leads from the chamber 50 to a heater 56 which has a pair of pipes 57 and 58 depending therefrom, closed at their bottoms but with the slits 59 in their sides near the bottoms. The pipe 57 extends down between the tank 10 and the shell 19 while the pipe 58 extends down between the shell 27 and the sleeve 34. A bent pipe 60 with a valve 61 therein is connected to the chamber 50, so that if more steam is used in the turbine than is necessary to heat the water, the valve 61 may be opened so much as is necessary to let the excess steam escape.

The operation of the outfit shown in Figs. 1 to 3, and 14 and 15 will now be apparent: the cold milk descends through the pipe 30, the pasteurizing heater being so located, as seen at the upper left hand corner of Fig. 13, so that the milk can pass by gravity through it and be discharged by gravity into the holder and thence pass by gravity to the water cooler and thence again by gravity to the brine cooler, as will be more fully hereinafter explained. The milk flows down into the narrow annular passage formed between the reentrant portions of the sleeves 19 and 27, which are separated by a very slight distance so that the sheet of milk passing between them is thin, as compared with the body of water by which it is surrounded. At the bottom, the milk passes outwardly in an annular sheet and then rises in the annular passage formed between the main portions of the sleeves 19 and 27, these main portions being closer together than the reentrant portions so as to make the sheet of milk still thinner and thus more subject to the action of the hot water. At the top, the milk passes around through the enlarged annular passage made by the portion 22 and flows out through the discharge pipe 23. The hot water is supplied from the pipe 55, and flows down in the two branches 57 and 58 into the annular channels formed between the tank 10 and the shell 19 and between the shell 27 and the shell 34 respectively, a considerable body of hot water thus flowing down in the opposite direction to the movement of the body of milk rising between them. The water flowing down from the pipe 57 at the bottom flows inward through the annular passage and then up in the annular passage formed between the reentrant portion of the shell 19 and the sleeve 15, and then flows down through the sleeve 15 and out through the pipe 18. The hot water descending through the pipe 57 flows down to the bottom and then passes inward through the openings 35 and rises in the annular passage formed between the shell 34 and the reentrant portion of the shell 27, until it comes to the top of the apparatus where it enters the pipe 36 and flows through that down through the pipe 39 and is discharged into the bottom and flows inward and joins the water from the pipe 57 in passing upward on the outside of the sleeve 15 and then downward on the inside of the sleeve. By this arrangement it will be obvious that a sheet of hot water flows on both sides of the sheet of milk and in the opposite direction, so that the greatest heat is applicable to the milk as it is leaving the pasteurizer so that it will have the desired temperature.

Where the unit thus far described is used for heating the milk, the water is heated preferably by the steam passing through the pipe 48 and driving the turbine 47, seen in Fig. 14, and then passes down through the pipe 49 into the chamber 50 where it is condensed in the manner previously described. On the lower end of the shaft 41 on which the turbine 47 is secured is the helical flange 60, which is rotated by the turbine in such a manner that the water flowing from the pipe 18 into the tube 40 is lifted by the action of the screw to the pipe 52 whence it flows down and out through the nozzle 51. The condensing chamber 50 is actually located above the level of the header 56 so that the water runs down through the pipe 55 to the header, thus making a continuous circuit through the apparatus so that the water will be continually reheated by the steam which drives the turbine.

In Figs. 4 to 9, I have shown a more complicated form of the same invention which differs therefrom mainly in the fact that by providing an additional annular reentrant portion of the two inner shells, the length of the tortuous passage is substantially doubled. This necessitates the employment of additional or changed elements as follows: The tank or outer shell 10 is made of greater diameter and in place of having the single upwardly projecting sleeve 15, it is provided with a similar but necessarily larger concentric sleeve 15$^a$ provided with the packing 16$^a$. The bottom shell 19 is consequently necessarily provided with an intermediate annular reentrant portion 20$^a$, which surrounds the sleeve 15$^a$, and in place of having the single pipe 24 projecting from the side of the bottom, it is necessary to provide two pipes 24$^a$ projecting downward through the bottom of the tank and having the packing nuts 25$^a$ and the cocks 26$^a$ so that all the milk can be drawn off from the two annular chambers thus formed. The intermediate tank 27 is similarly modified, and in order to form a larger annular discharge passage for the milk at the top it is preferably provided with an inwardly projecting horizontal flange 27$^a$ opposite the flange 21, and the offset portion 27$^b$. It is also provided with the reentrant and annular portion 33$^a$, which surrounds the annular portion 20$^a$ of the intermediate shell, and the top of this reentrant annular portion 33$^a$ is provided with the supplemental pipe 31$^a$ to let out the air when the milk is first supplied to the apparatus in a run. The sleeve 34 is modified preferably by making the main outer portion double by using the outer shell 34$^x$ and filling the annular space thus produced with the heat retaining packing 34$^y$. A supplemental inner sleeve 34$^a$ has to be provided between the shell 33 and the annular shell 33$^a$, and it is connected to the sleeve 34 by the horizontal annular member 34$^b$. The pipe 39 is preferably shortened and opens into what may be considered a fixed pipe 39$^a$ formed by soldering a semicircular piece to the interior of the tank 10. A vent pipe 34$^c$ extending up from the member 34$^b$ permits the air beneath the latter to escape when water is first introduced.

Figure 4:
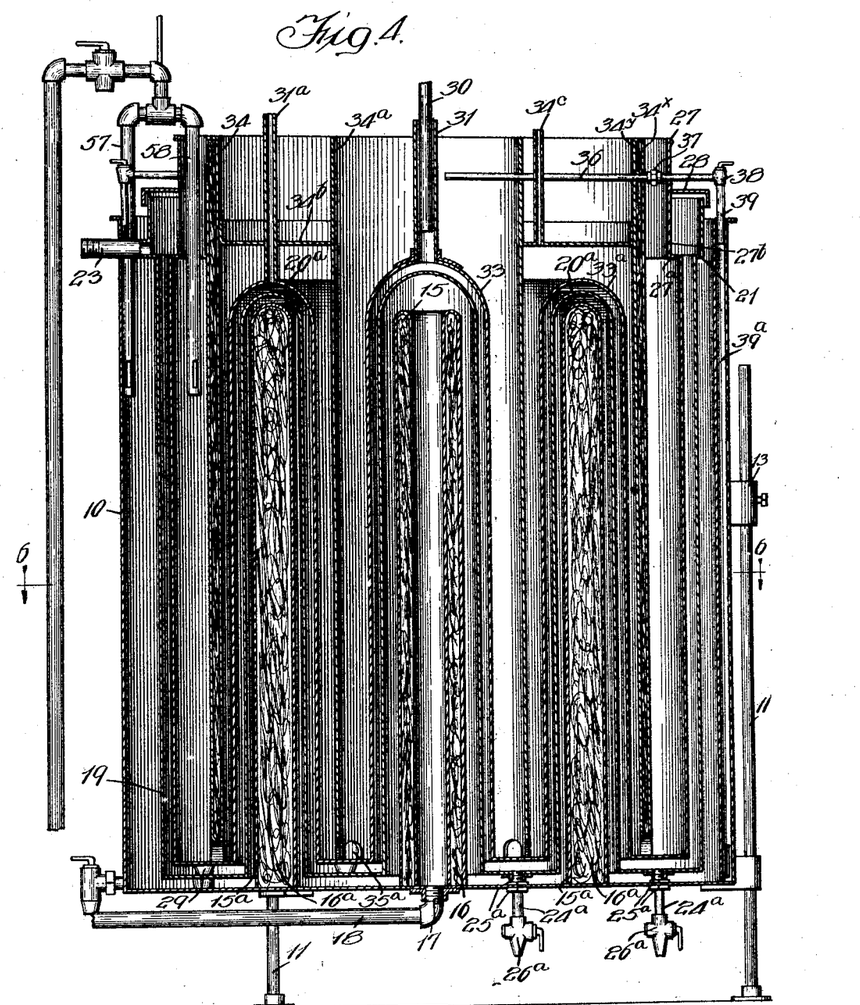
Fig. 4 is a central vertical section of a more complicated form of the apparatus.
Figure 5:
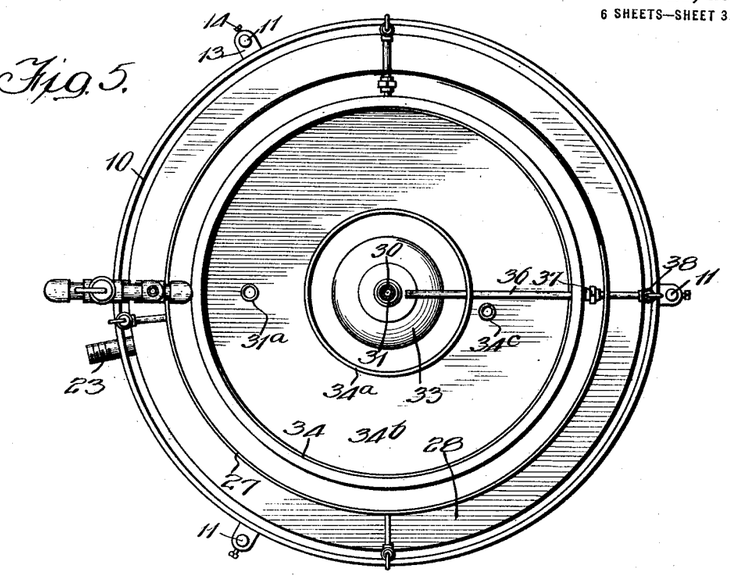
Fig. 5 is a top plan view of the form shown in Fig. 4.
Figure 6:
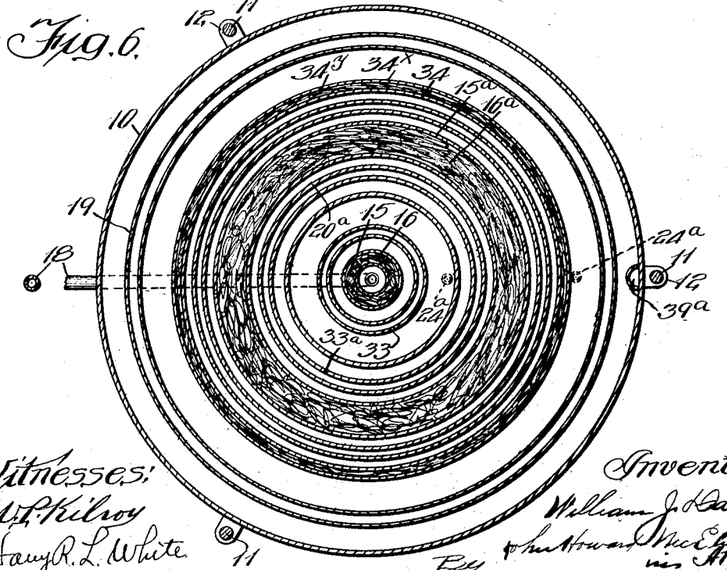
Fig. 6 is a plan view in section on the line 6—6 of Fig. 4.

The operation of this modified apparatus is not essentially different from that of the apparatus shown in Fig. 1, since the milk descends through the pipe 30 and thence down through the narrow annular channel at the center of the device and then at the bottom moves outward until it reaches the narrow annular channel through which it ascends and at the top it passes outward until it reaches the narrow annular channel through which it descends until it reaches the bottom when it passes outward again until it reaches the final narrow annular channel through which it ascends until it reaches the wider annular channel at the top through which it passes to discharge as before from the pipe 23. The hot water descends through the pipe 57 down in the annular channel between the tank 10 and the shell 19 until it reaches the bottom when it flows inward and passes up and then inward and then down in the annular channel formed on the two sides of the annular sleeve 15$^a$, from which it passes inwardly at the bottom until it reaches the annular channel surrounding the central sleeve 15 down which it passes and is discharged through the pipe 18 as before. The rest of the hot water descends through the pipe 58 and down the annular channel bounded on the inside by the sleeve $34^x$ and then up through the annular channel bounded on the outside by the same sleeve, and then inward to the annular channel bounded on the inside by the sleeve $34^a$, down which channel it passes to the bottom, when it passes inward through the apertures $35^a$ and rises through the annular channel bounded on the outside by the sleeve $34^a$ to the top thereof, where the water passes outward through the pipe 36, joint 37, cock 38 and pipe 39 to the passage $39^a$ which carries the hot water to the bottom of the apparatus where it passes inwardly joining the hot water which has passed downward to the same point from the pipe 57.

Figures 7, 8, 9, 10, 11:
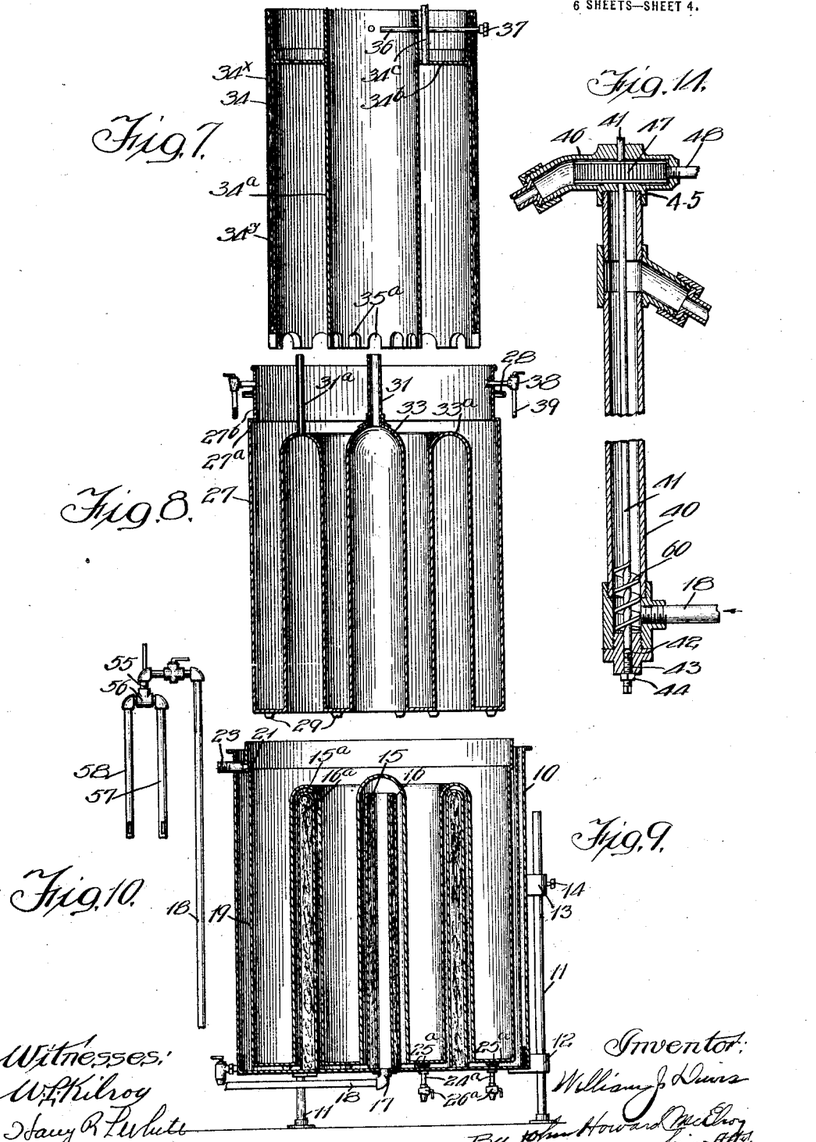
Figs. 7, 8 and 9 are views of the three principal elements as seen in section in Fig. 4, but on a smaller scale, and with the elements separated one from the others.
Fig. 10 is a view of the water supply pipe detached.
Fig. 11 is a central vertical section through a modified form of my device.
Figure 11:
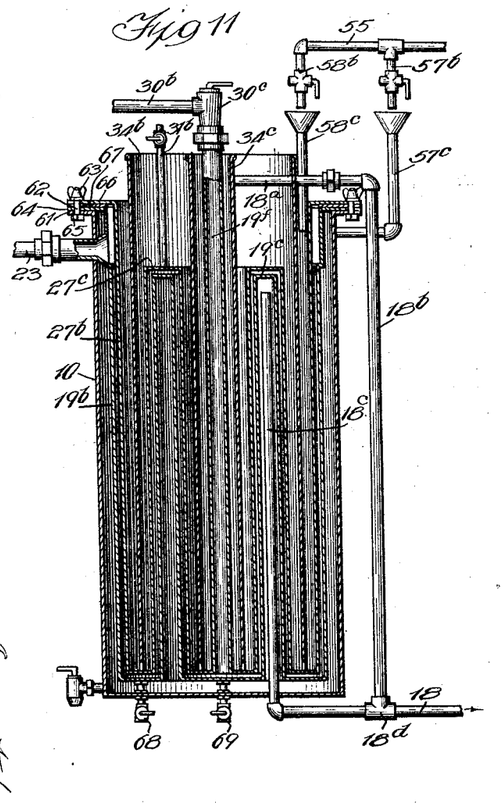

In the modification shown in Fig. 11, the tank 10 is employed as before, but is provided with an outwardly projecting horizontal flange 61 at its top through which is passed a plurality of securing bolts 62 provided with wing nuts 63. The shell $19^b$ has a flange 64 at its top with recesses 65 therein registering with the bolts 62. It has the annular reentrant portion $19^c$ and the annular bottom portion and the circular central bottom portion provided with the cocks 68 and 69 which extend through the bottom of the tank 10 so as to draw off the milk from the bottom when the operation ceases. The shell $27^b$ has a flange 66 on it similar to the flange 64 with corresponding recesses, and the two flanges 64 and 66 are spaced apart by the ring 67 interposed between them for that purpose. The shell $27^b$ is constructed with the reentrant annular portion $27^c$ embracing the annular portion $19^c$, and in the top of this annular portion is the vent pipe $31^b$ with the valve at the top which can be opened when the apparatus is first filled with milk to let the air out. At the bottom of its central portion it is connected to the pipe $19^f$ which is connected to the cock $30^c$ which in turn is connected to the pipe $30^b$ through which the milk enters. The sleeve $34^b$ with the recesses in the bottom is placed inside of the shell $27^b$ and the sleeve $34^c$ with the cutaway portions at its bottom in turn is placed around the pipe $19^f$. The milk enters through the pipe $30^b$, passing through the pipe $19^f$ to the bottom where it spreads out and rises through the narrow annular channel to the top where it flows outwardly and descends through the continuing narrow annular channel to the bottom whence it flows outward and ascends through the final narrow annular channel between the outer portions of the shells $19^b$ and $27^b$, until it reaches the enlarged channel at the top to which the discharge pipe 23 for the milk is connected as before. The hot water, or cooling water if it is used for cooling, passes through the pipe 55 to the valve $57^b$ which discharges into pipe $57^c$ opening into the tank 10 at its top, so that the water descends on the outside of the shell $19^b$ and passes toward the center, rising through the annular portion formed by the reentrant annular portion of the shell $19^b$, to the top, where it enters the pipe $18^c$ through which it descends to the tee $18^d$ which is connected to the discharge pipe 18, as before. Some of the hot water passes from the pipe 55 through the valve $58^b$ and down through the pipe $58^c$ which is suitably supported so as to discharge the water into the annular passage the inner wall of which is formed by the outer face of the shell $34^b$, and it passes down to the bottom and then inward, and then up through the annular passage the outer portion of which is formed by the inside of the shell $34^b$, where it passes inward and down through the annular passage the inner face of which is formed by the outside of the shell or sleeve $34^c$ to the bottom where it passes inward through the apertures in the bottom of the shell and then up through the annular passage the outer surface of which is formed by the inside of the shell $34^c$ to the top where it passes outward through the pipe $18^a$ which is connected by the union as shown to the pipe $18^b$ opening into the tee $18^d$ where it joins the water from the pipe $57^c$.

With this construction, as well as with those heretofore described, it will be obvious that the parts can be readily disassembled for cleaning, as all that is necessary is to uncouple the various unions when the sleeves $34^b$ and $34^c$ can be lifted out, after which the shells $27^b$ and $19^b$ can be successively removed, and it will be noted especially that when the parts are disassembled all the surfaces which come in contact with the milk can be readily and thoroughly cleaned and sterilized.

Figure 12:
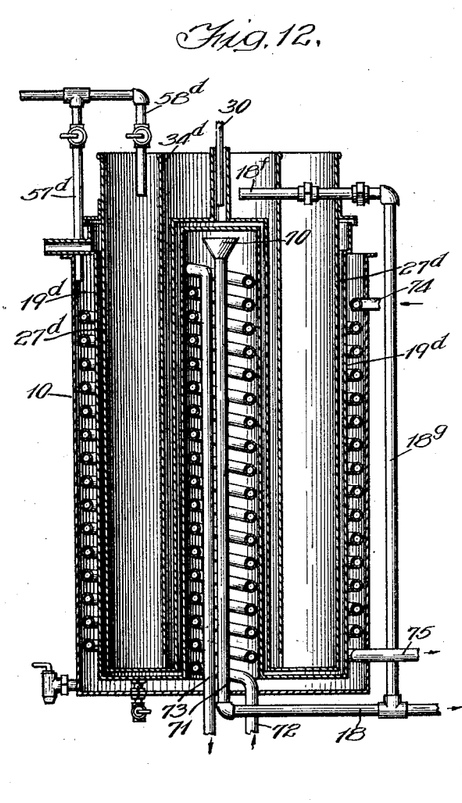
Fig. 12 is a similar view of still another modification employing brine coils for producing a lower temperature than is possible by the use of water alone.

In the modification shown in Fig. 12, which I may employ for the final or brine cooler, the tank 10 has the shell $19^d$ therein as before with the shell $27^d$ inside that so that the narrow annular milk passage is formed betwen the shells. These shells have the single reentrant circular portion, and the milk enters as before through the pipe 30. The sleeve $34^d$ is employed as before, and the hot water is supplied as before by the pipes $57^d$ and $58^d$, and it will be noted that the cold water will descend through the pipe $57^d$ to the bottom and then to the center and then upward to the top where it enters the funnel-shaped top 70 of the pipe 71 which is connected to the discharge pipe 18. The cold water from the pipe $58^d$ passes down through the annular passage the inner face of which is formed by the outer portion of the sleeve $34^d$ and then it passes inward through the openings in the bottom of the sleeve and passes upward through the annular channel the outside of which is formed by the inside of the sleeve 34ᵈ. At the top, it flows outward through the pipe 18ᶠ to the pipe 18ᵍ to which it is connected by the necessary detachable unions, and which pipe 18ᵍ is connected to the discharge pipe 18 as before. With this construction, however, I preferably employ brine coils to further lower the temperature of the cold water, and for this purpose I may force the brine up through the pipe 72 which is formed in a helix inside of the reentrant portion of the shell 19ᵈ, and which has the discharge portion 73 extending down through the center of the helix. For cooling the outermost layer of water, I may introduce the brine through the pipe 74, which is formed as a larger helix just inside of the tank 10 and has the pipe 75 discharging therefrom at the bottom.

Figure 13:
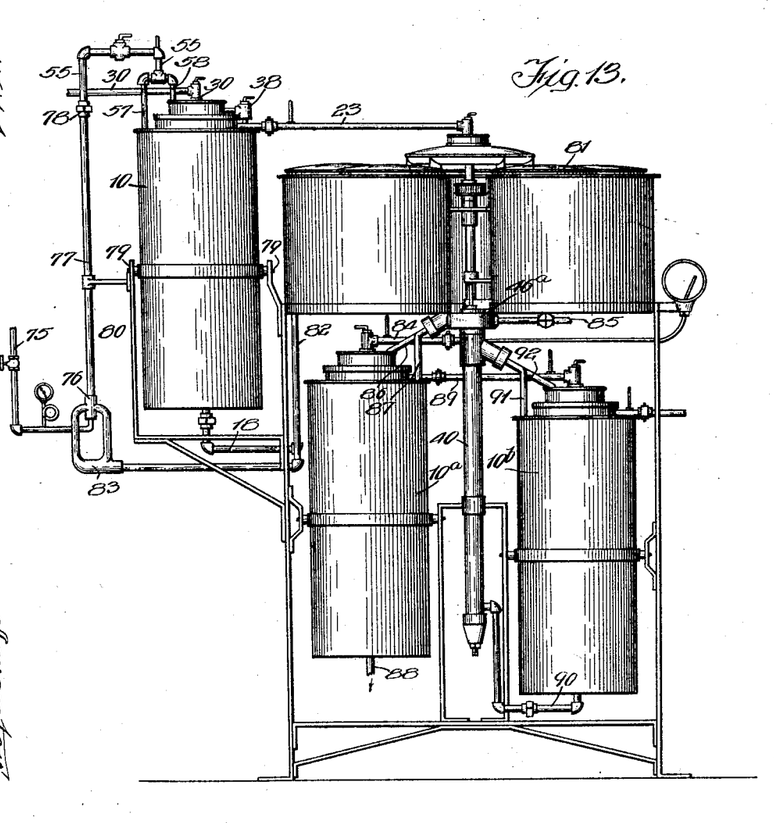
Fig. 13 is an elevation of a complete pasteurizing outfit employing my invention.

In Fig. 13 I illustrate a complete pasteurizing system in which the steam for heating the milk may be introduced through the supply pipe 75 which opens into the injector 76 through which the heated water from the holder ascends, and the water with additional heat rises through the pipe 77 which is connected by the union 78 to the pipe 55 heretofore described. The tank 10 for the hot water may be constructed in any of the forms heretofore shown, except that shown in Fig. 12, and I preferably provide it with the trunions 79 by which it is journaled in a frame 80 so that when the various unions have been disconnected the tank can be turned to a horizontal position the more readily to disassemble the parts. With this construction, the milk which has been raised to a pasteurizing temperature passes from the pipe 23 to the holder 81 which may be of the form shown in my application 291,682, filed February 25, 1919. The hot water passing through the tank 10 is discharged through the pipe 18 into the outer tank of the holder 81 so as to keep the contents of the holder at the desired pasteurizing temperature, and the overflow passes downward from the holder through the pipe 82 which is connected to the loop 83 of the aforesaid injector. From the holder, the milk passes through the pipe 84 to the center of the tank 10ᵃ, which may be constructed in any of the forms heretofore shown except that shown in Fig. 12, and the cold water for cooling the milk is furnished by the supply pipe 85 which furnishes the water to the turbine 46ᵃ, which is designed to be operated by water instead of steam, and the outlet of the turbine is connected to two pipes 86 and 87 corresponding to the pipes 57 and 58, and the cold water after it has passed through the unit 10ᵃ is discharged through the pipe 88 at the bottom to the sewer. The brine unit 10ᵇ is mounted at a lower level than the tank 10ᵃ, so that the discharge pipe 89 for the milk from the unit 10ᵃ will carry it to the top of the unit 10ᵇ where it empties into the center as before. The brine supply is discharged from the bottom through the pipe 90 which opens into the tube 40 which is constructed as shown in Fig. 14, and a turbine operated by the cold water supply serves to pump the brine up to the top of the tube 40 where it is discharged through the tubes 91 and 92 to the unit 10ᵇ in the same manner as it is discharged through the tubes 57 and 58 in the unit 10, so that by the apparatus shown a constant circulation of the brine and of the heating water is obtained by the action of the cold water supply and the steam supply without the use of any auxiliary pumping apparatus. The tanks 10ᵃ and 10ᵇ are preferably mounted on trunnions as before, and the complete apparatus will be arranged so that all the parts can be readily detached and dis-assembled so as to get at all the surfaces touched by the milk for the purpose of cleaning and sterilizing them.

In some cases, it is difficult to remove the contents of the shells, and for this purpose I may employ a siphon, such as illustrated in Fig. 15, which consists of a handle 93 connecting a pair of tubes 94 and 95, of which one is longer than the other, with a valve 96 at the top which can be manipulated to start the water flowing through the sleeves in a well known manner.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States is:

1. In a device of the class described, the combination with an outer tank shell having a water outlet at the bottom thereof and a sleeve projecting upward from the bottom thereof to elongate the path of the water therethrough, of an intermediate shell adapted to be placed therein and having a milk outlet near the top thereof, an inner shell having a milk inlet to the annular space between it and the intermediate shell, and means for continuously supplying temperature changing liquid to the inner shell and drawing it off from the bottom of the outermost shell.

2. In a device of the class described, the combination of an outer tank shell having a water outlet at the bottom thereof and a sleeve projecting upward from the bottom thereof around said outlet to elongate the path of the water therethrough, of an intermediate shell adapted to be placed in the outer shell and having a milk outlet near the top thereof, an inner shell having a milk inlet to the annular space between it and the intermediate shell, said inner shell having a sleeve projecting upward from the bottom thereof to elongate the path of the water therethrough, and means for continuously supplying temperature changing liquid to the upper part of the two annular temperature changing liquid spaces formed by the shells on the two sides of the annular space for the milk likewise formed by the shells and for drawing it off from the bottom of the outermost shell.

3. In a device of the class described, the combination of an outer tank shell having a water outlet at the bottom thereof and a sleeve projecting upward from the bottom thereof around said outlet to elongate the path of the water therethrough, of an intermediate shell adapted to be placed in the outer shell and having a milk outlet near the top thereof, an inner shell having a milk inlet to the annular space between it and the intermediate shell, said inner shell having a sleeve projecting upward from the bottom thereof to elongate the path of the water therethrough, and means for continuously supplying temperature changing liquid to the inner shell and drawing it off from the bottom of the outermost shell.

4. In a device of the class described, the combination with an outer tank shell having a water outlet at the bottom thereof and a pair of concentric sleeves projecting upward from the bottom thereof to elongate the path of the water therethrough, of an intermediate shell adapted to be placed therein and having a milk outlet near the top thereof, an inner shell having a milk outlet to the annular space between it and the intermediate shell, a pair of concentric sleeves projecting downwardly into the inner shell to elongate the path of the water therethrough, said intermediate and inner shells having reentrant annular cylindrical portions to increase the internal surface thereof and elongate the path of the milk between them, and means for continuously supplying temperature changing liquid to the upper part of the two annular temperature changing liquid spaces formed by the shells on the two sides of the annular space for the milk likewise formed by the shells and for drawing it off from the bottom of the outermost shell.

5. In a device of the class described, the combination with an outer tank shell having a water outlet at the bottom thereof, of an intermediate shell adapted to be placed therein and having a milk outlet near the top thereof, an inner shell having a milk inlet to the annular space between it and the intermediate shell, and a sleeve projecting upwardly from the bottom thereof to elongate the path of the water therethrough, said intermediate and inner shells having reentrant cylindrical portions to increase the internal surface thereof and elongate the path of the milk between them, and means for continuously supplying temperature changing liquid to the upper part of the two annular temperature changing liquid spaces formed by the shells on the two sides of the annular space for the milk likewise formed by the shells and for drawing it off from the bottom of the outermost shell.

6. In a device of the class described, the combination with an outer tank shell having a water outlet at the bottom thereof, of an intermediate shell adapted to be placed therein and having a milk outlet near the top thereof, an inner shell having a milk inlet to the annular space between it and the intermediate shell, said intermediate and inner shells having reentrant annular and cylindrical portions to increase the internal surface thereof and elongate the path of the milk between them, and means for continuously supplying temperature changing liquid to the inner shell and drawing it off from the bottom of the outermost shell.

7. In a device of the class described, the combination with an outer tank shell having a water outlet at the bottom thereof, of an intermediate shell adapted to be placed therein and having a milk outlet near the top thereof, an inner shell having a milk inlet to the annular space between it and the intermediate shell, said intermediate and inner shells having reentrant annular and cylindrical portions to increase the internal surface thereof and elongate the path of the milk between them, and means for continuously supplying temperature changing liquid to the upper part of the two annular temperature changing liquid spaces formed by the shells on the two sides of the annular space for the milk likewise formed by the shells and for drawing it off from the bottom of the outermost shell.

8. In a device of the class described, the combination with an outer tank shell having a water outlet at the bottom thereof and a pair of concentric sleeves projecting upward from the bottom thereof to elongate the path of the water therethrough, of an intermediate shell adapted to be placed therein and having a milk outlet near the top thereof, an inner shell having a milk outlet to the annular space between it and the intermediate shell, a pair of concentric sleeves projecting downwardly into the inner shell to elongate the path of the water therethrough, said intermediate and inner shells having reentrant annular and cylindrical portions to increase the internal surface thereof and elongate the path of the milk between them, and means for continuously supplying the temperature changing liquid to the inner shell and drawing it off from the bottom of the outermost shell.

9. In a device of the class described, the combination with an outer tank shell having a water outlet at the bottom thereof and a pair of concentric sleeves projecting upward from the bottom thereof to elongate the path of the water therethrough, of an intermediate shell adapted to be placed therein and having a milk outlet near the top thereof, an inner shell having a milk outlet to the annular space between it and the intermediate shell, a pair of concentric sleeves projecting downwardly into the inner shell to elongate the path of the water therethrough, said intermediate and inner shells having reentrant annular and cylindrical portions to increase the internal surface thereof and elongate the path of the milk between them, and means for continuously supplying temperature changing liquid to the upper part of the two annular temperature changing liquid spaces formed by the shells on the two sides of the annular space for the milk likewise formed by the shells and for drawing it off from the bottom of the outermost shell.

10. In a device of the class described, the combination with a plurality of shells forming a passage for a thin sheet of milk flowing therethrough in one direction and also two other passages on both sides thereof for a temperature changing fluid, of connections for permitting the milk to flow through its passage in one direction and for causing two separate portions of the temperature changing fluid to flow simultaneously through its two passages in the opposite direction from the flow of the milk.

11. In a device of the class described, the combination with a plurality of shells forming a passage for a thin sheet of milk flowing therethrough in one direction and also two other passages on both sides thereof for a temperature changing fluid, which two passages finally unite, of connections for permitting milk to flow through its passage in one direction and for causing two separate portions of the temperature changing fluid to flow simultaneously through its two passages in the opposite direction from the flow of the milk.

12. In an apparatus of the class described, the combination with a container having a passage for a thin body of milk, and passages surrounding the same for a temperature changing fluid, of a steam supply, a steam turbine, a temperature changing fluid circulator actuated by the turbine, and connections so that the temperature changing fluid is passed through the circulator and its passages and has the steam from the turbine discharged thereinto for the purpose described.

13. In an apparatus of the class described, the combination with a container having a passage for a thin body of milk and passages surrounding the same for a temperature changing fluid, of a steam supply, a steam turbine, a tube through which the turbine shaft extends, a helical flange on the turbine shaft in the tube, a temperature changing fluid pipe connecting the bottom of the container and the bottom of the tube, and connections between the top of the tube and the container.

14. In an apparatus of the class described, the combination with a container having a passage for a thin body of milk and passages surrounding the same for a temperature changing fluid, of a steam supply, a steam turbine, a tube through which the turbine shaft extends, a helical flange on the turbine shaft in the tube, a temperature changing fluid pipe connecting the bottom of the container and the bottom of the tube, and connections between the top of the tube and the container, said connections including a steam expansion chamber into which the exhaust steam from the turbine is discharged, and a spraying nozzle connected to the top of the tube and opening into the steam expansion chamber.

15. In an apparatus of the class described, the combination with a turbine casing, of a tube coaxial therewith, a turbine in said casing, a shaft connected to the turbine and journaled in the tube, a helical flange secured on the shaft in the tube, and connections for passing a temperature changing fluid through the turbine casing to rotate the shaft and helical flange to circulate another temperature changing fluid through the tube.

16. In an apparatus of the class described, the combination with a turbine casing, of a tube coaxial therewith, a turbine in said casing, a shaft connected to the turbine and journaled in the tube, a helical flange secured on the shaft in the tube, a temperature changing container with two tortuous passages therethrough for the temperature changing fluid and the milk, and connections for passing a temperature changing fluid through the turbine casing to rotate the shaft and helical flange to circulate another temperature changing fluid through the tube.

17. A milk treating apparatus comprising a milk heating member, a holder and water heater and a circulating system heated by said heater, said circulating system comprising a liquid circuit from the heater to the milk heating member, from the milk heating member to the holder and from the holder to the heater.

18. A milk treating apparatus comprising a milk heating member, a holder and water heater and a circulating system heated by said heater, said circulating system comprising a liquid circuit from the heater to the milk heating member, from the milk heating member to the holder and from the holder to the heater, said holder comprising a plurality of vats and a tank containing the vat through which the liquid of the circulating system circulates.

19. A milk handling apparatus having means for causing the milk to flow in a thin tortuous annular film, and means for causing a liquid to flow on both sides of said thin annular tortuous film adjacent said film, and in a direction opposite the flow of milk, said first means comprising a first member having inner and outer cylindrical walls, and a bottom connecting said cylindrical walls and comprising also a second member fitting inside said first member, said second member having inner and outer cylindrical walls, and a bottom connecting said inner and outer cylindrical walls, the walls of said inner member being located adjacent the walls of said outer member, whereby said walls between them form guides for the thin annular film of milk, said means for causing the liquid to flow in a direction opposite the flow of milk comprising a cylindrical partition between the inner and outer walls of said second member, and means for causing liquid to flow in one direction between said partition and the outer wall of said second member, and in the opposite direction between said partition and the inner wall of said second member.

20. A milk handling apparatus having means for causing milk to flow in a thin tortuous annular film, and means for causing the liquid to flow on both sides of said thin annular tortuous film adjacent said film and in a direction opposite the flow of milk, said first means comprising a first member having inner and outer cylindrical walls and a bottom connecting said cylindrical walls and comprising also a second member fitting inside said first member, said second member having inner and outer cylindrical walls, and a bottom connecting said inner and outer cylindrical walls, the walls of said inner member being located adjacent the walls of said outer member, whereby said walls between them form a guide for the thin annular film of milk, means for causing the liquid to flow in one direction along the outer wall of said second member, and in the opposite direction along the inner wall of said second member, said inner member being readily removable from said outer member, whereby access may be had to the surfaces in contact with the milk for cleaning.

21. A milk handling apparatus having means for causing the milk to flow in a thin tortuous annular film, and means for causing liquid to flow on both sides of said thin annular tortuous film adjacent said film, and in a direction opposite the flow of milk, said first means comprising a first member having inner and outer cylindrical walls, and a bottom connecting said cylindrical walls, and comprising also a second member having inner and outer cylindrical walls, the walls of said inner member being located adjacent the walls of said outer member, whereby said walls between them form a guide for the thin annular film of milk, said means for causing the liquid to flow in a direction opposite the flow of milk comprising a cylindrical partition between the inner and outer walls of said second member, and means for causing the liquid to flow in one direction between said partition and the outer wall of said second member, and in the opposite direction between said partition and the inner wall of said second member, said cylindrical partition being readily removable from said second member.

22. A milk handling apparatus having means for causing the milk to flow in a thin tortuous annular film, and means for causing a liquid to flow on both sides of said thin annular tortuous film, adjacent said film, and in a direction opposite the flow of the milk, said first means comprising a first member having inner and outer cylindrical walls, and a bottom connecting said cylindrical walls and comprising also a second member fitting inside said first member, said second member having inner and outer cylindrical walls and a bottom connecting said inner and outer cylindrical walls, the walls of said inner member being located adjacent the walls of said outer member, whereby said walls between them forming guides for the thin annular film of milk, said means for causing the liquid to flow in a direction opposite the flow of milk comprising a shell member, having a cylindrical wall outside the outer wall of said first member and a cylindrical wall inside the inner wall of said first member, and a bottom connecting said walls, and a cylindrical partition between the inner and outer walls of said second member, and means for causing the heat transferring liquid to flow in one direction between said partition and the outer wall of said second member, and in the opposite direction between said partition and the inner wall of said second member, and means for causing the heat transferring liquid to flow in one direction between the outer wall of said shell member, and the outer wall of said first member and in the opposite direction between the inner wall of said shell member and the inner wall of said first member.

In witness whereof, I have hereunto set my hand and affixed my seal, this 10th day of January, A. D. 1920.

WILLIAM J. DAVIS. [L. S.]

Witness:
JOHN HOWARD McELVOY.